US008281323B2

(12) United States Patent
Dash et al.

(10) Patent No.: US 8,281,323 B2
(45) Date of Patent: *Oct. 2, 2012

(54) TECHNIQUES FOR ESTABLISHING VIRTUAL DEVICES

(75) Inventors: Sambit Kumar Dash, Karnataka (IN); Harpreet Singh Walia, Karnataka (IN)

(73) Assignee: Novell, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/224,397

(22) Filed: Sep. 2, 2011

(65) Prior Publication Data

US 2011/0321066 A1      Dec. 29, 2011

Related U.S. Application Data

(63) Continuation of application No. 12/271,247, filed on Nov. 14, 2008, now Pat. No. 8,051,432.

(51) Int. Cl.
*G06F 13/00* (2006.01)

(52) U.S. Cl. ............ 719/319; 718/1; 719/321; 719/328; 719/330

(58) Field of Classification Search ...... 718/1; 719/319, 719/321, 328, 330
See application file for complete search history.

(56) References Cited

U.S. PATENT DOCUMENTS

| 6,546,434 | B1 | 4/2003 | Snow et al. | |
|---|---|---|---|---|
| 6,760,784 | B1 | 7/2004 | Bodin et al. | |
| 6,785,894 | B1 | 8/2004 | Ruberg | |
| 6,981,259 | B2 | 12/2005 | Luman et al. | |
| 7,114,176 | B2 | 9/2006 | Patton et al. | |
| 7,269,832 | B2 | 9/2007 | Bodin et al. | |
| 7,392,172 | B2 | 6/2008 | Rostampour | |
| 7,574,709 | B2 | 8/2009 | Erlingsson et al. | |
| 7,853,960 | B1 | 12/2010 | Agesen et al. | |
| 7,865,908 | B2 * | 1/2011 | Garg et al. | 719/321 |
| 7,930,705 | B2 * | 4/2011 | Vo et al. | 719/328 |
| 7,966,169 | B2 * | 6/2011 | Vega | 703/23 |
| 7,996,785 | B2 * | 8/2011 | Neil | 715/778 |
| 8,099,718 | B2 * | 1/2012 | Nagabhushan et al. | 717/130 |
| 2008/0077713 | A1 | 3/2008 | Kim et al. | |
| 2010/0125856 | A1 | 5/2010 | Dash et al. | |

* cited by examiner

*Primary Examiner* — Andy Ho
(74) *Attorney, Agent, or Firm* — Schwegman, Lundberg & Woessner, P.A.

(57) ABSTRACT

Techniques for establishing virtual devices are presented. A legacy control system is encapsulated as a virtual device. The virtual device is isolated within a host hardware associate with a host OS and access to and from the virtual device is authenticated and controlled by the host OS. Legacy hardware used by the legacy control system is connected to the host hardware, thereby permitting the legacy control system to continue to access the legacy hardware when the virtual device processes.

20 Claims, 4 Drawing Sheets

TECHNIQUES FOR ESTABLISHING VIRTUAL DEVICES

RELATED APPLICATIONS

The present application is a Continuation of, and claims priority to U.S. patent application Ser. No. 12/271,247, entitled: "Techniques for Establishing Virtual Devices," filed on Nov. 14, 2008, now issued as U.S. Pat. No. 8,051,432, and the disclosure of which is incorporated by reference herein in its entirety.

BACKGROUND

Many industries have long implemented their core business processes in software systems. For example, process oriented industries such as chemical plants and power plants are known to keep their core processes in software systems for many years. Also, sometimes it is hard to stop the process control metrics and measurement methodologies within an enterprise. These plants are initially setup for years of operation but the control or software systems, which utilize hardware like personal computers connecting to the systems through General Purpose Interface Buses, Analogue-to-Digital convertors or other logical circuits have to be designed with a particular computer Operating System (OS) in mind.

However, software and hardware becomes outdated faster than the control or software systems of an enterprise. Moreover, old software may not be designed to handle new and more frequent security threats that information systems are constantly exposed to in today's highly networked environment. Additionally, support for older versions of OS's may be discontinued by an OS vendor. So, with these modern realities any modern enterprise that continues to run legacy control or software systems is treading on dangerously thin ice, which can be fatal to the enterprise depending upon the nature of the industry.

Consequently, enterprises may expend huge sums of capital and large amounts of human resources to continue to support outdated hardware and OS's because to do otherwise could put the entire enterprise in jeopardy. The alternative is to undergo a large internal infrastructure project to port the control or software systems to modern hardware and modern versions of an OS. Yet, with the alternative approach the enterprise can find itself in a perpetual cycle where as soon as one port ends another one has to begin because what was considered modern has since become outdated. It is apparent that many industries are faced with difficult choices and large expenditures to continue their existing operations and practices. These expenses are often passed onto the consumer such that eventually a smaller more nimble startup company can enter the market at a lower price point with a more modern internal infrastructure for its control and software systems; this puts extreme and sometimes insurmountable pressure on the enterprise from a competitive standpoint.

Thus, what are needed are techniques, which allow for improved support, integration, and security of legacy control or software systems to allow enterprises to be more competitive in today's environment.

SUMMARY

In various embodiments, techniques for establishing virtual devices are presented. More specifically, and in an embodiment, a method is provided that establishes a virtual device to isolate and migrate a legacy control or software system in a different OS and machine architecture from its native OS and native machine architecture.

DETAILED DESCRIPTION

As used herein a "virtual device" refers to a virtual machine (VM) that processes its own version of a particular OS and mimics a particular machine architecture on another and entirely different machine architecture. The VM is a logical machine that is independent of its physical process environment or physical machine. Again, the VM includes its own OS, its own file system (FS), its own directory services, etc., which may each be different from the physical processing environment of the host machine. As used herein virtual device and VM maybe used interchangeably.

A "legacy control system" refers to a processing environment and suite of software services that was originally designed to process on one or more particular machine architectures and one or more particular OS's or versions of a particular OS. These machine architectures, OS's, and versions of a particular OS are referred to herein as "native" machine architectures, OS's and versions of a particular OS; native with respect to the legacy system. The legacy control system also relies at least in part on access to legacy hardware or legacy devices associated with its native machine architectures.

According to an embodiment, the techniques presented herein are implemented in products associated and distributed by Novell®, Inc. of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit various aspects of the invention.

It is within this initial context, that various embodiments of the invention are now presented with reference to the FIGS. 1-4.

Figure 1:
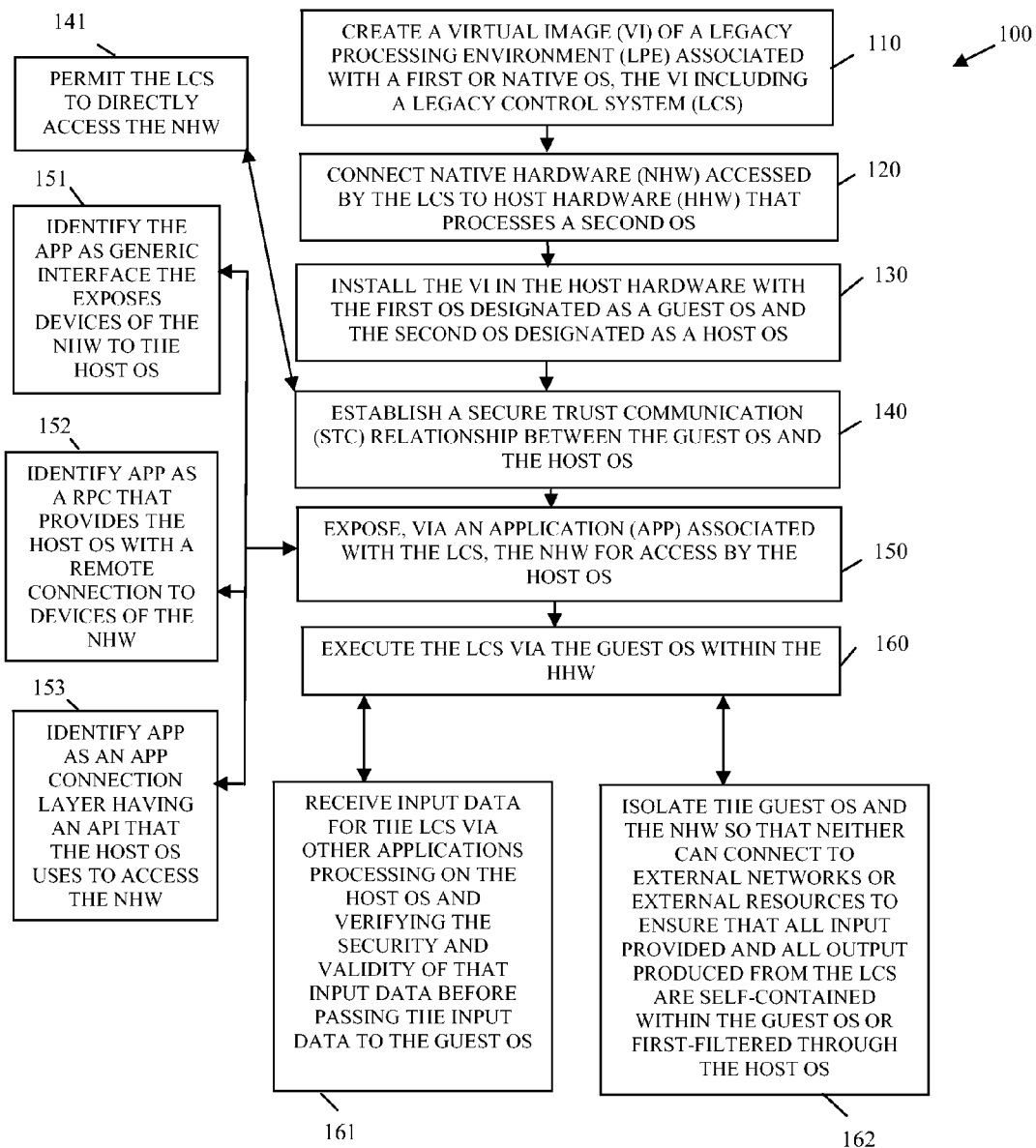
FIG. 1 is a diagram of a method is provided that establishes a virtual device to isolate and migrate a legacy control or software system in a different OS and machine architecture from its native OS and native machine architecture, according to an example embodiment.

FIG. 1 is a diagram of a method 100 is provided that establishes a virtual device to isolate and migrate a legacy control or software system in a different OS and machine architecture from its native OS and native machine architecture, according to an example embodiment. The method 100 (hereinafter "virtual device establishment service") is implemented as instructions in a machine-accessible and readable medium. The instructions when executed by a machine (processing device, computer, etc.) perform the processing depicted in FIG. 1. The virtual device establishment service is also operational over and processes within a network. The network may be wired, wireless, or a combination of wired and wireless.

At 110, the virtual device establishment service creates a virtual image of a legacy processing environment associated with a first or native OS. The virtual image includes a legacy control system that relies on: the legacy processing environment; the first, native or legacy OS; and access to legacy or native hardware. Any physical to virtual application or service can be used to create the virtual image, such applications or services are available for purposes of backing up hardware and software systems.

At 120, the virtual device establishment service connects native hardware that the legacy control system accesses during its operation to host hardware that also processes a second OS.

At 130, the virtual device establishment service installs the virtual image in the host hardware, such that the first or legacy OS of the virtual image is designated as a guest OS on the host hardware. The second OS is designated as a host or controlling OS for the host hardware.

At 140, the virtual device establishment service establishes a secure trust communication relationship between the guest OS and the host OS. That is, the host OS and the guest OS authenticate to one another during startup and initialization and perhaps periodically or even during each communication between the two. Any technique of combinations of techniques can be used to establish this secure trust relationship.

According to an embodiment, at 141, the virtual device establishment service permits the legacy control system, via the guest OS, to directly access the native or legacy hardware. This is permitted once the secure trust communication relationship has been established and the guest OS authenticated. The legacy control system may access a variety of legacy or native hardware that may be outdated or not supported by the host hardware and the host OS; thus, by connecting the native hardware to the host hardware and installing the guest OS with the legacy control system, the legacy control system can still access this legacy hardware. This hardware can include a variety of things, such as mechanical devices uses in an enterprise that have processor-enabled capabilities, outdated computers, old storage devices, etc. The legacy control system can continue to use its old device interfaces to directly access the devices associated with the legacy hardware. Thus, the legacy control system is essentially encapsulated by the virtual device establishment service within host hardware, which has a modern and updated host OS; and yet, the legacy control system can continue to process unabated using old device drivers to access that legacy hardware even while the legacy control system essentially processes on the host hardware.

At 150, the virtual device establishment service exposes (via an application associated with either a service installed within the virtual image when it was created or associated with the legacy control system) the native hardware for access and perhaps monitoring by the host OS. Thus, the host OS can gain access to the native hardware. This can be achieved in a number of ways.

For example, at 151, the virtual device establishment service identifies the application as a generic device driver that exposes each device associated with the native hardware to the host OS as a particular device driver that is accessible to the host OS.

In another case, at 152, the virtual device establishment service identifies the application as a Remote Procedure Call (RPC), which permits the host OS to establish a remote connection. The remote connection exposes device drivers for devices of the native hardware back to the host OS. This can be done via software on the guest OS that exposes the device drivers for the native hardware devices as user level application objects. The host OS communicates with the guest OS through a user mode of operation.

In yet another situation, at 153, the virtual device establishment service identifies the application as an application connection layer that is provided for the native hardware and that includes an Application Programming Interface (API) for the host to connect to the devices of the native hardware. This API can be supplied by the hardware vendor or other vendors with an interest in providing such an API. The API permits the host OS to connect to outdated or unsupported devices associated with the legacy or native hardware.

At 160, the virtual device establishment service executes the legacy control system via the guest OS within or on the host hardware. So, as stated before, the legacy control system is essentially encapsulated as a virtual device or virtual machine (VM) on the host hardware and installed and executed on the host hardware as a guest OS that is communicated with and controlled by a host OS. The legacy control system can still access its needed legacy hardware and its associated devices.

According to an embodiment, at 161, the virtual device establishment service receives input data for the legacy control system via other applications that process within the host OS on the host hardware. These other applications can be used to verify the security of and validity of any input data before it is passed on to the legacy control system via the host OS to the guest OS. So, essentially a legacy control system can benefit from more updated security mechanisms because the applications are running on an updated host OS. The legacy control system then benefits and is made more secure because input data is processed and validated before that data ever reaches the guest OS and the legacy control system. The applications can also be used to enhance features of the legacy control system. The enhancement are embodied on a more modern host OS, such that enhancements to the legacy control system does not have to continue to occur via outdated technology.

In still another case, at 162, the virtual device establishment service is used to isolate the guest OS and its native hardware so that neither can connect to external networks or external resources. This is done to ensure that all input provided and output produced from the legacy control system are self-contained within the confines of the guest OS or first-filtered through the host OS that can enforce modern security mechanisms against any attempted external accesses. The legacy control system, via the guest OS, is walled off from the outside world much like a firewall does an Intranet and yet as discussed above the legacy control system can still be enhanced via applications that are developed on modern architectures and can be interfaced to via security mechanisms associated with those modern architectures.

Figure 2:
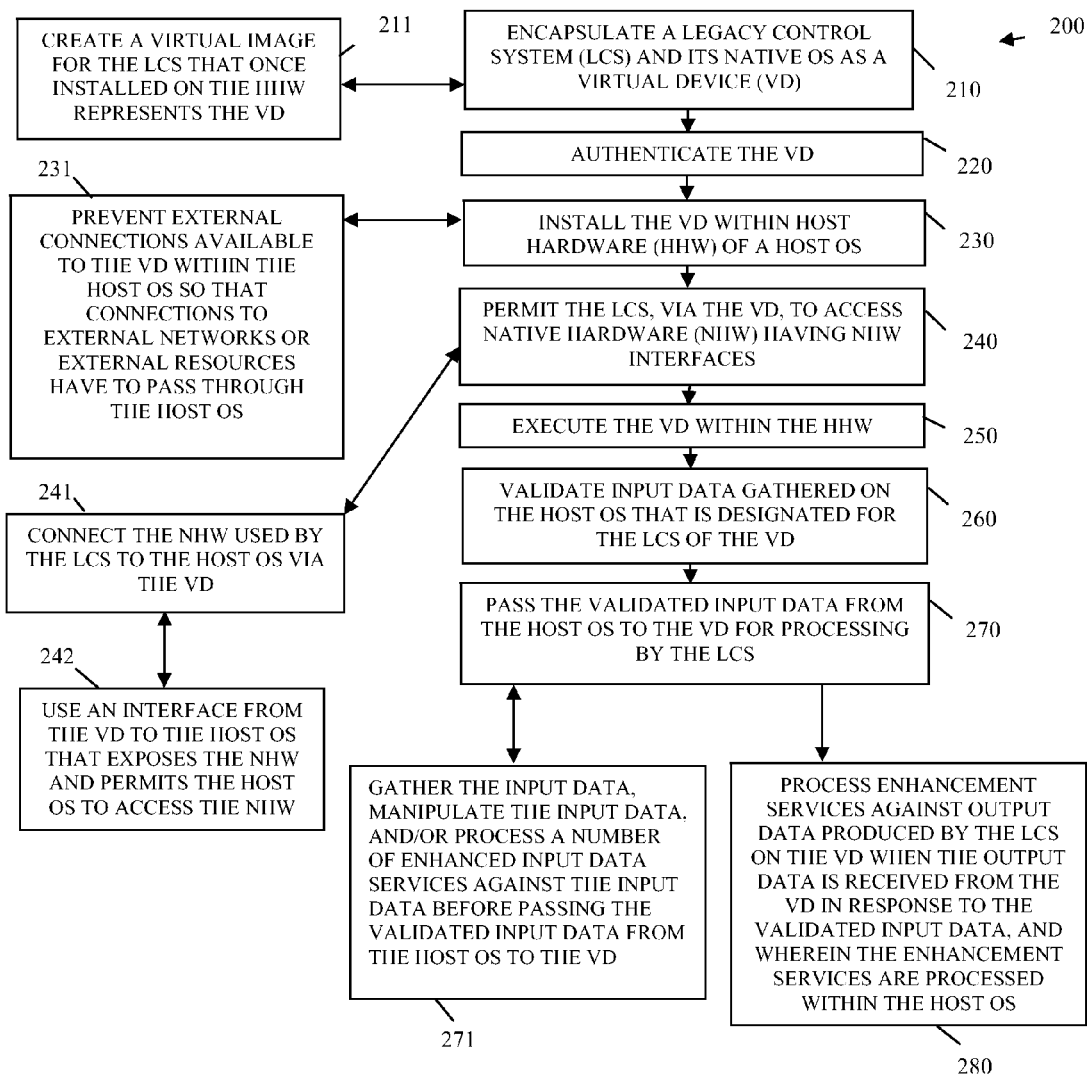
FIG. 2 is a diagram of another method that establishes a virtual device to isolate and to migrate a legacy control or software system in a different OS and machine architecture from its native OS and native machine architecture, according to an example embodiment.

FIG. 2 is a diagram of another method 200 that establishes a virtual device to isolate and migrate a legacy control or software system in a different OS and machine architecture from its native OS and native machine architecture, according to an example embodiment. The method 200 (herein after referred to as "legacy system encapsulation service") is implemented in a machine-accessible and readable medium as instructions, which when accessed by a machine performs the processing depicted in the FIG. 2. The legacy system encapsulation service is also operational over a network; the network may be wired, wireless, or a combination of wired and wireless.

The legacy system encapsulation service represents another and in some cases an enhanced perspective to the virtual device establishment service represented by the method 100 of the FIG. 1.

At 210, the legacy system encapsulation service encapsulates a legacy control system and its native or legacy OS as a virtual device.

One technique for doing this was discussed above with reference to the method 100 of the FIG. 1. Specifically, at 211, the legacy system encapsulation service creates a virtual image for the legacy control system that includes the native processing environment of the legacy control system, the native OS, and the legacy control system. When the virtual image is installed on the host hardware of a host OS, the virtual image represents the virtual device or a virtual machine (VM).

At 220, the legacy system encapsulation service authenticates the virtual device before that virtual device is permitted to install and execute on host hardware. It is again noted that the host hardware includes more updated or modern host hardware from the native hardware associated with the legacy control system and includes a more updated or modern host OS from the native OS of the legacy control system. Any authentication technique can be used or combination of authentication techniques to authenticate the virtual device.

At 230, the legacy system encapsulation service installs the virtual device within host hardware of the host OS. So, now the legacy control system is set to execute on more modern and updated hardware and yet its native hardware is encapsulated within the virtual device so that the legacy control system believes that it is still processing on that native hardware. The legacy control system continues to process within the virtual device on its native OS, but the virtual device executes on the host hardware.

According to an embodiment, at 231, the legacy system encapsulation service prevents external connections that are available to the virtual device within the host OS so that these external connections to external networks and/or external resources have to first pass through the modern and updated host OS. The virtual device is walled off within the host hardware and the host OS.

At 240, the legacy system encapsulation service permits the legacy control system, via the virtual device, to access some devices associated with its original native hardware using legacy native hardware device drivers that the legacy control system is configured to use.

In some cases, at 241, the legacy system encapsulation service facilitates connections between the host OS and the native hardware via one or more services provided within the virtual device. For example, at 242, the legacy system encapsulation service uses an interface from the virtual device that exposes the native hardware and its devices to the host OS and permits the host OS to access those devices of the native hardware. This was discussed at length along with other mechanisms to achieve this above with reference to the method 100 of the FIG. 1.

At 250, the legacy system encapsulation service executes the virtual device within or on the host hardware.

At 260, the legacy system encapsulation service also validates input data gathered on the host OS for the virtual device before that input data is passed through from the host OS to the virtual device and ultimately the legacy control system of the virtual device. Again, this can be used to enforce modern or enhanced security that the legacy control system may not have been able to address given its legacy processing environment.

At 270, the legacy system encapsulation service passes the validated input data from the host OS to the virtual device for processing by the legacy control system within its legacy processing environment, which is encapsulated within the virtual device.

In an embodiment, at 271, the legacy system encapsulation service: gathers input data, manipulates the input data, and/or processes a number of enhanced input data services against that validated input data before the validated input data is passed from the host OS to the virtual device.

According to an embodiment, at 280, the legacy system encapsulation service processes enhancement services against output data produced by the legacy control system on the virtual device. This is done when the output data is received from the virtual device in response to the validated input data. The enhancement services are processed within the host OS. So, not only can input to the legacy control system be enhanced and have added security but output produced by the legacy control system can be enhanced. The input/output enhancements occur via services developed and executed within a modern host OS on modern host hardware.

Figure 3:
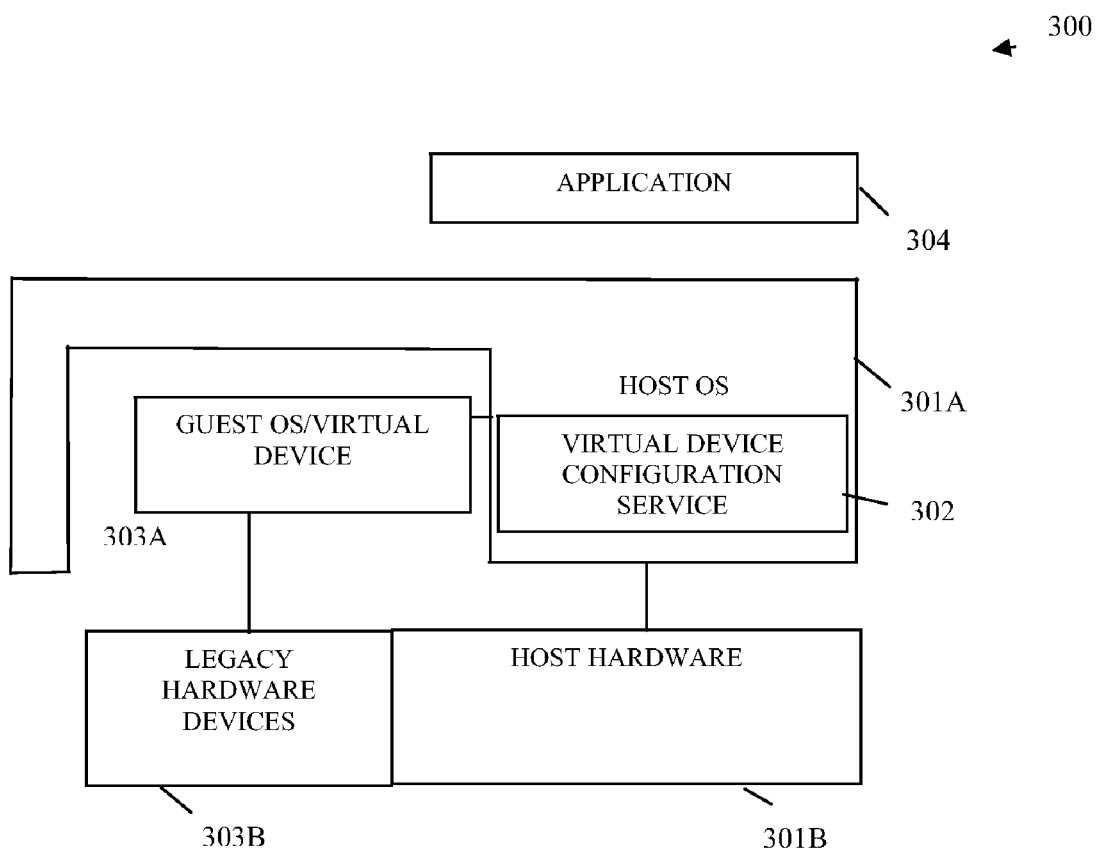
FIG. 3 is a diagram of a virtual device establishment system, according to an example embodiment.

FIG. 3 is a diagram of a virtual device establishment system 300, according to an example embodiment. The virtual device establishment system 300 is implemented in a machine-accessible and computer-readable storage medium as instructions, which when accessed by a machine performs, among other things, the processing depicted in the methods 100 and 200 of the FIGS. 1 and 2, respectively. The virtual device establishment system 300 is also operational over a network; the network may be wired, wireless, or a combination of wired and wireless.

The virtual device establishment system 300 includes a host operating system 301A and a virtual device configuration service 302. The virtual device establishment system 300 may also include one or more applications 304. Each of these components and their interactions with one another will now be discussed in turn.

The host OS 301A is implemented as instructions within a computer-readable storage medium that processes on host hardware 301B (such as a modern computer, etc.). Example aspects of the host OS 301A and its features were discussed in detail above with reference to the methods 100 and 200 of the FIGS. 1 and 2, respectively.

The virtual device configuration service 302 is also implemented as instructions within a computer-readable storage medium and processes on the host hardware 301B. Example aspects of the virtual device configuration service 302 and its features were discussed in detail above with reference to the methods 100 and 200 of the FIGS. 1 and 2, respectively.

The virtual device configuration service 302A creates a virtual image or virtual device 303A that processes as a guest OS 303A. The virtual device 303A is a virtual image for a legacy control system, a legacy processing environment used by the legacy control system, and a legacy OS used by the legacy processing environment. The virtual image or virtual device 303A is installed and isolated within the host hardware 301B and that virtual device 303A is executed as a guest OS 303A. External access to and from the virtual device 303A is validated and controlled by the host OS 301A.

Furthermore, legacy hardware 303B is accessed by the legacy control system by connecting the legacy hardware 303B to the host hardware 301B so that the virtual device 303A can directly access that legacy hardware 303B.

In an embodiment, a generic interface exposes the legacy hardware 303B to the host OS 301A and thereby permits the host OS 301A to also access the legacy hardware 303B.

Example techniques for achieving this were presented above with reference to the methods 100 and 200 of the FIGS. 1 and 2, respectively.

In an embodiment, the host OS 301A can use the generic interface to also authenticate the legacy hardware 303B.

In some cases the virtual device establishment system 300 also includes an application 304.

The application 304 is implemented in a computer-readable storage medium that processes within the host OS 301A on the host hardware 301B. The application 304 gathers and supplies input data to the virtual device 303A for processing by the legacy control system. The input data is validated and verified for security purposes before that input data is passed from the host OS 301A to the virtual device 303A. So, the application 304 can service as a form of an enhanced preprocessor for the legacy control system.

In some cases the application 304 can also be used as an enhanced post processor for the legacy control system. Here, the application 304 gathers and further alters output data received from the legacy control system via the virtual device 303A. The output data is produced by the legacy control system in response to the input data supplied by the application 304 via the host OS 301A.

Figure 4:
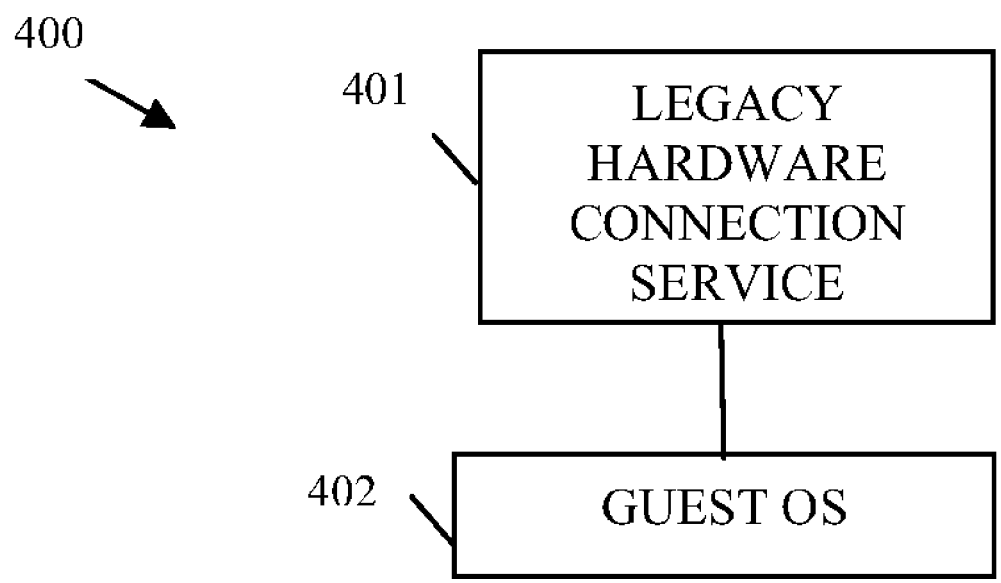
FIG. 4 is a diagram of another virtual device establishment system, according to an example embodiment.

FIG. 4 is a diagram of another virtual device establishment system 400, according to an example embodiment. The virtual device establishment system 400 is implemented as instructions on or within a machine-accessible and computer-readable storage medium. The instructions when executed by a machine perform, inter alia; the processing depicted with respect to the methods 100, 200 of the FIGS. 1-2, respectively. The virtual device establishment system 400 is also operational over a network and the network may be wired, wireless, or a combination of wired and wireless.

The virtual device establishment system 400 is another and in some cases enhanced perspective to virtual device establishment system 300 represented by the FIG. 3, presented above.

The virtual device establishment system 400 includes a legacy hardware connection service 401 and a guest OS 402. Each of these will now be discussed in turn.

The legacy hardware connection service 401 is implemented in a computer-readable storage medium and processes on a host OS that executes on host hardware. Example aspects of the legacy hardware connection service 401 were presented above with respect to the methods 100 and 200 of the FIGS. 1 and 2, respectively.

The legacy hardware connection service 401 exposes legacy hardware accessed by a legacy control system to the host OS. The legacy control system is encapsulated and isolated for processing within the guest OS 402.

The legacy hardware connection service 401 permits the legacy control system to access the legacy hardware while the legacy control system executes within the guest OS 402.

The guest OS 402 is implemented in a computer-readable storage medium and also processes on the host hardware. The guest OS 402 may also be considered the virtual device discussed in detail above with reference to the FIGS. 1-3.

In an embodiment, the host OS validates and verifies for security purposes all input passed from the host OS to the legacy control system via the guest OS 402.

In another case, the host OS executes an enhancement service that alters output data produced by the legacy control system via the guest OS 402.

Also, in some situations, direct connections to and emanating from the guest OS 402 to external networks and/or external resources are prohibited by the host OS.

It is now appreciated how a legacy control system can be executed on modern architectures that utilize modern OS'S and still have access to legacy hardware. Moreover, the legacy control systems can be enhanced via applications developed on and processed from the modern OS'S. Still further modern security mechanisms can be automatically and dynamically integrated into the legacy control systems via processing from the modern OS's.

External access to and from the guest OS 402 is controlled by the host OS.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method implemented in a non-transitory computer-readable storage medium for execution on a machine, comprising:
   interfacing, by the machine, legacy hardware accessed by a legacy control system associated with a legacy processing environment and a first operating system (OS) to host hardware that processes a second OS; and
   initiating, by the machine, the first OS having the legacy control system as a virtual image that is a guest OS on the host hardware with the second OS designated as a host OS.

2. The method of claim 1 further comprising, permitting, by the machine, the legacy control system of the virtual image, via the guest OS, to directly access the legacy hardware once the guest OS is authenticated.

3. The method of claim 1 further comprising, exposing, by the machine, a legacy device driver for a legacy device of the legacy hardware to the host OS as a generic device driver for the legacy device.

4. The method of claim 1 further comprising, exposing, by the machine, an application programming interface (API) to the legacy control system of the virtual image to the host OS, the API providing connection access between the host OS and the legacy hardware.

5. The method of claim 1 further comprising, interfacing, by the machine, host OS applications to legacy applications of the guest OS.

6. The method of claim 5 further comprising, validating, by the machine, input data passed from the host OS applications to the legacy applications before permitting the input data to be passed to the guest OS.

7. The method of claim 5 further comprising, modifying, by the machine, input data passed from the host OS applications to the legacy applications before permitting the modified input data to be passed to the guest OS.

8. The method of claim 5 further comprising, validating, by the machine, output data passed from the legacy applications to the host OS applications before permitting the output data to be passed to the host OS.

9. The method of claim 5 further comprising, modifying, by the machine, output data passed from the legacy applications to the host OS applications before permitting the modified output data to be passed to the host OS.

10. A machine-implemented method implemented in a non-transitory computer-readable storage medium for execution on a machine, comprising:
   creating, by the machine, a virtual device from a legacy control system and its native Operating System (OS);
   initiating, by the machine, the virtual device within host hardware of a host OS; and
   permitting the legacy control system, via the virtual device, to access native hardware having native hardware interfaces from the host hardware of the host OS by using the native OS.

11. The method of claim 10, wherein creating further includes authenticating the virtual device for access on the host OS.

12. The method of claim 11, wherein initiating further includes establishing a secure connection between the guest OS and the host OS.

13. The method of claim 10, wherein initiating further includes preventing external network connections to the virtual device from within the host OS.

14. The method of claim 10, wherein permitting further includes connecting the native hardware used by the legacy control system to the host OS via the virtual device.

15. The method of claim 10, wherein permitting further include validating input data passed from the host OS to the legacy control system and validating output data passed from the legacy control system to the host OS.

16. The method of claim 10, wherein permitting further modifying input data before the input data is passed from the host OS to the legacy control system and modifying output data before the output data is passed from the legacy control system to the host OS.

17. The method of claim 16, wherein modifying further includes modifying the input data and the output data via enhancement applications that process in the host OS.

18. A machine-implemented system, comprising:
   host hardware having a host Operating System (OS) implemented in a non-transitory computer-readable storage medium and to process on the host hardware; and
   the host hardware also having a virtual device implemented in a non-transitory computer-readable storage medium and to process on the host hardware;
   wherein the virtual device represents a processing image of a legacy control system that processes within a legacy OS and that accesses legacy hardware, and the legacy OS processed as a guest OS, and access to and from the virtual device is controlled by the host OS.

19. The system of claim 18, wherein the legacy hardware accessed by the legacy control system is interfaced to the host hardware for access by the virtual device.

20. The system of claim 18, wherein an interface exposes the legacy hardware to the host OS and permits the host OS to access the legacy hardware.

* * * * *